(12) United States Patent
Beckwith et al.

(10) Patent No.: US 8,887,131 B2
(45) Date of Patent: Nov. 11, 2014

(54) OPTIMIZED CODE GENERATION BY ELIMINATING UNUSED VIRTUAL FUNCTION

(75) Inventors: William Beckwith, Great Falls, VA (US); Lance Kibblewhite, Leesburg, VA (US)

(73) Assignee: Objective Interface Systems, Inc., Herndon, VA (US)

( * ) Notice: Subject to any disclaimer, the term of this patent is extended or adjusted under 35 U.S.C. 154(b) by 1632 days.

(21) Appl. No.: 12/073,788

(22) Filed: Mar. 10, 2008

(65) Prior Publication Data

US 2009/0138847 A1 May 28, 2009

Related U.S. Application Data

(60) Provisional application No. 60/905,822, filed on Mar. 9, 2007.

(51) Int. Cl.
*G06F 17/30* (2006.01)
*G06F 9/45* (2006.01)
*G06F 9/44* (2006.01)

(52) U.S. Cl.
CPC .............. *G06F 9/443* (2013.01); *G06F 8/4434* (2013.01)
USPC .......................................... 717/108; 707/755

(58) Field of Classification Search
USPC .......................................... 717/108; 707/755
See application file for complete search history.

(56) References Cited

U.S. PATENT DOCUMENTS

| | | | |
|---|---|---|---|
| 6,063,128 A | 5/2000 | Bentley et al. | |
| 2002/0095669 A1* | 7/2002 | Archambault | 717/157 |
| 2004/0040029 A1 | 2/2004 | Debbabi et al. | |
| 2004/0268323 A1* | 12/2004 | Tanaka et al. | 717/136 |
| 2006/0164269 A1* | 7/2006 | Trimbell et al. | 341/106 |
| 2007/0006191 A1* | 1/2007 | Franz et al. | 717/146 |

FOREIGN PATENT DOCUMENTS

CA 2171898 A1 9/1997

OTHER PUBLICATIONS

Craig Chambers et al. (1996) "Whole-Program Optimization of Object-Oriented Languages", Department of Computer Science and Engineering, University of Washington, pp. 1-70.
International Search Report and Written Opinion dated Jun. 27, 2008, directed to counterpart PCT/US08/03122 application. (9 pages).
Extended Search Report issued in European Application No. 08726628.4 dated Nov. 3, 2011.
Narisawa et al., "A Code Generator with Application-Oriented Size Optimization for Object-Oriented Embedded Control Software, in Object-Oriented Technology: ECOOP '98 Workshop Reader," Jan. 1, 1998, Springer Berlin Heidelberg, Berlin, vol. 1543, pp. 507-510.
Bacon et al., "Fast Static Analysis of C++ Virtual Function Calls," Proceedings of the 2009 ACM SIGPLAN conference on Programming language design and implementation, PLDI '09, vol. 31, No. 10, Oct. 1, 1996, pp. 324-341.

* cited by examiner

*Primary Examiner* — Alexey Shmatov
(74) *Attorney, Agent, or Firm* — Robert S. Babayi; Vector IP Law Group

(57) ABSTRACT

The present invention relates to a method for reducing the object code size of an application that requires run-time dispatching of object oriented methods. The method comprises scanning an object file corresponding to the application for references to object oriented methods in a dispatch table that performs run-time object oriented method binding. The highest inheritance level associated with an object oriented method is found. All references to object oriented methods above the highest inheritance level are designated as unused. All references to object oriented methods below the highest inheritance level are designate as used. All references to object oriented methods that are designated as unused are deleted from the dispatch table.

7 Claims, 1 Drawing Sheet

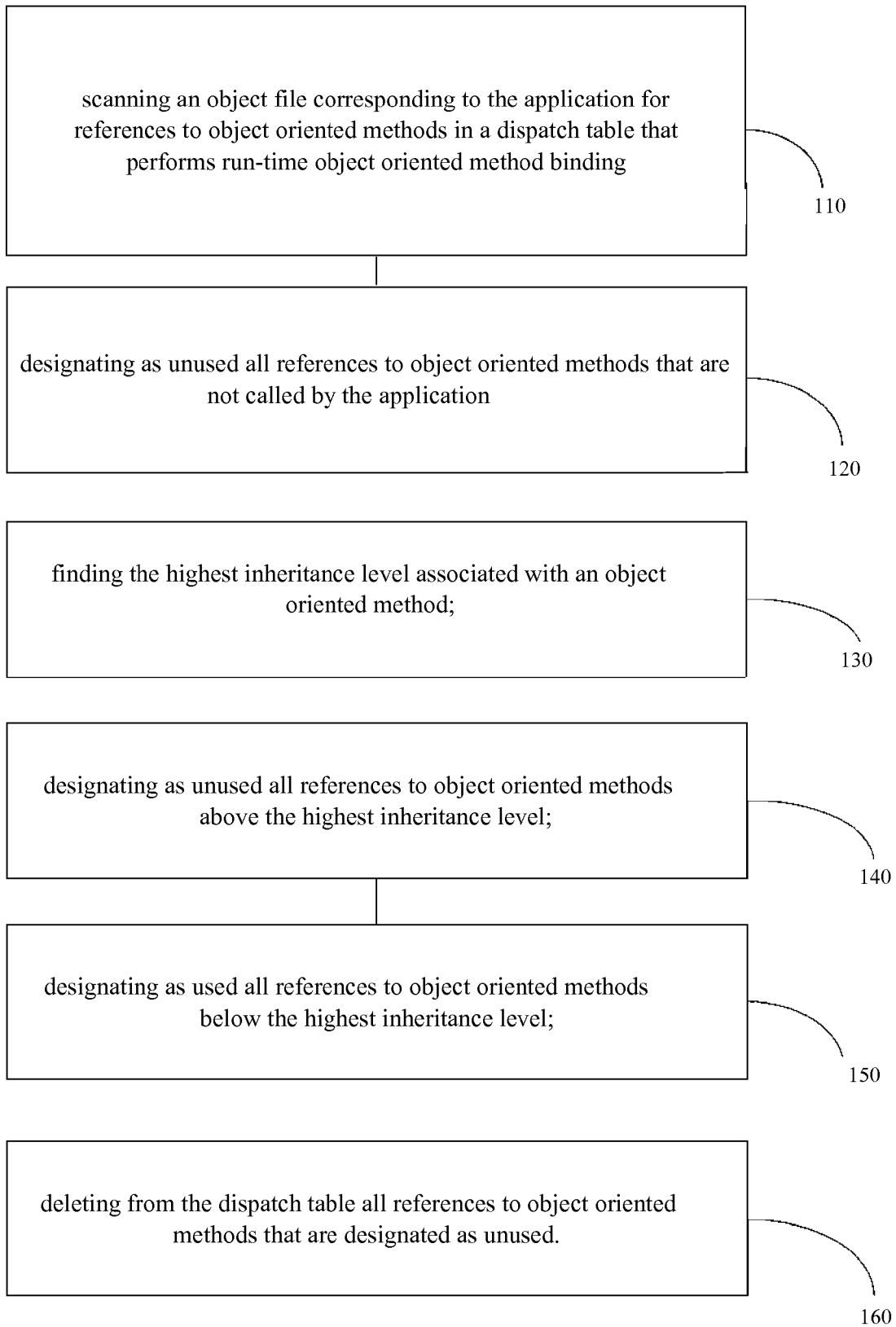

OPTIMIZED CODE GENERATION BY ELIMINATING UNUSED VIRTUAL FUNCTION

FIELD OF INVENTION

The present invention relates to reducing code generated through source code compilation.

BACKGROUND

In software programming, a compiler is a computer program (or set of programs) that translates text written in a computer language (the source language) into another computer language (the target language). The original text language is usually called the source code and the output language is usually called object code. Commonly the output has a form suitable for processing by other programs (e.g., a linker), but it may be a human-readable text file. The Common Object File Format (COFF) and Executable and Linking Format (ELF) are examples of file formats for executables, object code, and shared libraries. A linker or link editor is a program that further processes the object code files and libraries generated by compilers and processes them into executable code. Some architectures will introduce additional steps of processing between compilation and linking for various purposes such as source-language-specific binding, auxiliary code generation, and automated instantiation refactoring. This chain of processing tools is sometimes called the program-build-tool-chain.

Executable code generated through compilation and linking is used to realize functionality of large and small products in a wide variety of applications. It is always desirable to produce smaller executable programs without reducing the correctness, performance, or functionality of the resulting program.

Embedded systems usually involve computers with less computing and memory resources. Typically embedded systems are reduced to the smallest computing resources feasible to support the target application to optimize the economic cost of each deployed system. Thus on embedded systems the size of the resulting executable code is even more critical. Each reduction in object code size may have direct financial benefit.

One area of emerging interest in embedded systems is Software Defined Radios (SDRs). A standard for building SDRs is the Software Communications Architecture (SCA), an open architecture framework promulgated by the U.S. militaries Joint Tactical Radio System (JTRS) program that governs the structure and operation of the radio, enabling it to dynamically load and run waveforms and be networked into an integrated system. The SCA specifies a foundation built upon CORBA (Common Object Request Broker Architecture) distributed communications services, such as ORBexpress® provided by Objective Interface Systems, and a Portable Operating System Interface (POSIX) compliant real-time operating system. The functions provided by the SCA results in a sophisticated software platform that may occupy significant computing resources on the radio, placing a strain on size, weight, and power (SWaP).

Software developers have been challenged to meet the stringent resource and performance requirements often associated with SDRs, including the footprint of executable code generated from compilation of developed source code. Known approaches for reducing software footprint include the use of a subset of CORBA standard and the Software Communications Architecture (SCA) standard. This approach, however, results in removal of functionality for achieving performance objectives. Developers must speculate which functionality to remove, which could result in inadequate functionality or imposing artificial restraints for many radios or waveforms. Moreover, by deviating from the standards, conformance tests, such as JTRS Technology Laboratory (JTeL) JTRS Test Application (JTAP), are likely to fail.

A method for reducing the size of executable code eliminates "dead code," namely, code that will not or could not ever be called or executed given a specific set of application code. Dead code, for example, is code that is not executed during any execution of the program, or code whose execution cannot affect the program's observable behavior. Another term sometimes used for dead code is "unreachable code".

Object-oriented programming (OOP) is a programming paradigm that uses "classes" and the instantiations of those classes called "objects" to facilitate the design and implementation of applications and computer programs. OOP utilizes several techniques, including inheritance, modularity, polymorphism, and encapsulation. Ada, C#, C++, Java, Objective C, and Smalltalk are examples of OOP languages. OOP languages have varying degrees of support for concepts such as the creation and calling of classes, class members, inheritance, multiple inheritance, virtual inheritance, virtual functions, and run-time dispatching to virtual functions. Run-time dispatching to virtual functions is frequently realized with mechanisms such as dictionaries, dispatch tables or vtables. Such languages also allows for creation of libraries that can be reused in many different applications. However, any given executable for a program will typically only use a portion of the code in that program and a portion of the code available in these libraries.

Several techniques are common in program-build-tool-chains to reduce the size of the executable program:

According to one technique, archive libraries containing multiple files of object code called modules are scanned by the linker and the linker only pulls in the modules necessary to resolve an external reference caused by a program's source code.

Problem (A): Unfortunately this technique pulls in all functions, methods, and variables within a module even if only one of the functions, methods, or variables in that module is referenced. This unfortunate effect cascades because all of the symbols referenced in the unneeded functions, methods, and variables will need further resolution and cause even more unneeded code from other modules and libraries to get pulled into to the executable application.

Problem (B): This technique is less useful for virtual functions in OOP languages. The compiler will always generate a dispatch table for every class that references the implementation of all of the virtual functions in that class. The result is that any reference to any function, method, or variable in a class in a module in a library will cause all of the virtual functions for a class to get pulled into the executable program even if these virtual functions cannot and thus will not ever be called.

One less common optimization of (1) is for the compiler to put each function, method, and variable in a separate module. This greatly reduces problem (1.A). This optimization does not help alleviate problem (1.B).

Other prior art has addressed the problem of eliminating unused functions; an example of such prior art is, e.g., A. Srivastava, "Unused procedures in object-oriented programming", ACM Letters on Programming Languages and Systems, 1(4), pp. 355-364. Other prior art has focused on eliminating dead code at the statement level; see e.g., A. Aho, R. Sethi, and J. D. Ullman, "Compilers, Principles, Techniques, and Tools", Addison-Wesley, 1986, and F. Tip, "A Survey of Program Slicing Techniques", Journal of Programming Languages 3, 3, (1995), pp. 121-189.

Still other prior art has addressed the elimination of data members and subobjects that are not accessed during any execution of an application; see Tip et al., "Slicing Class Hierarchies in C++", Proceedings of the Eleventh Annual Conference on Object-Oriented Programming, Languages, and Applications (OOPSLA'96), (San Jose, Calif., October 1996), ACM SIGPLAN Notices 31(10), pp. 179-197. Elimination of code related to class hierarchies that unnecessarily exhibit virtual inheritance is also know.

U.S. Pat. No. 5,983,020 discloses a rule-based engine for transformation of class hierarchy of an object-oriented program. The engine transforms a class hierarchy of an object-oriented program to a new class hierarchy based upon a set of rules. The new class hierarchy is a simplification of the inheritance structure that reduces the number of compiler-generated fields in objects.

U.S. Pat. No. 5,481,708 discloses a system and method for optimizing object-oriented compilations. The disclosed object-oriented development system includes a language compiler having an optimizer for generating computer applications with improved speed and size. C++ optimization methods include virtual function and base optimization, using thunks for virtual member pointers, and passing classes by value.

With the continuing requirement for reducing the size of executable code, particularly in applications where code footprint is at a premium, there still exists a need for a method or system that further reduces the size of generated executable code without compromising functionality or departing from standards.

SUMMARY OF THE PRESENT INVENTION

Briefly, the present invention relates to a method for reducing the object code size of an application that requires run-time dispatching of object oriented methods. The method comprises scanning an object file corresponding to the application for references to object oriented methods in a dispatch table that performs run-time object oriented method binding. The highest inheritance level associated with an object oriented method is found. All references to object oriented methods above the highest inheritance level are designated as unused. All references to object oriented methods below the highest inheritance level are designate as used. All references to object oriented methods that are designated as unused are deleted from the dispatch table.

According to some of the more detailed features of the present invention, all references to object oriented methods that are not called by the application are also designated as unused and deleted from the dispatch table. In one embodiment, the object oriented method supports dynamic-binding in object-oriented programming. In another embodiment, the object oriented method comprises a virtual function method. The method of the present invention can be implemented as a program-build-tool-chain or as an independent code optimization tool. The method can be implemented during the compilation of a source code or linking of an object code. The object file can be generated from at least one of a compiled or linked code.

BRIEF DESCRIPTION OF THE DRAWING

FIG. 1 is a flow chart of an exemplary embodiment of the present invention.

DESCRIPTION OF THE PRESENT INVENTION

An exemplary embodiment of the present invention is used to reduce the size of SDR executable code generated through source code compilation and linking in order to provide highly-optimized footprint in products that incorporate SCA and CORBA standards. However, the present invention is applicable to reducing object or executable code in any application that requires source code compilation involving run-time dispatching of object-oriented methods such as C++ virtual functions.

An exemplary system and method of the invention that removes unused virtual functions in order to reduce code size, including object, target or executable code derived from a source code that uses virtual functions. The present invention can be implemented at various locations within the program-build-tool-chain. The present invention is also realizable as a tool independent of a program-build-tool-chain.

As is well known in the C++ language, a virtual function (or virtual method) is the mechanism to support dynamic-binding and object-oriented programming. This concept is a very important part of the polymorphism portion of OOP. In OOP, polymorphism means allowing a single definition to be used with different types of data (specifically, different classes of objects). For instance, a polymorphic function definition can replace several type-specific ones, and a single polymorphic operator can act in expressions of various types. Thus, polymorphism is behavior that varies depending on the class in which the behavior is invoked, that is, two or more classes can react differently to the same message. More specifically, the ISO C++ standard, ISO/IEC 14882:1993(E) Programming Languages—C++, first edition 1998-09-01, states that:

"If a virtual member function vf is declared in a class Base and in a class Derived, derived directly or indirectly from Base, a member function vf with the same name and same parameter list as Base::vf is declared, then Derived::vf is also virtual (whether or not it is so declared) and it overrides Base::vf."

A dispatch table, virtual method table, virtual function table, or vtable (herein after referred to collectively as dispatch table) is a mechanism used to support dynamic polymorphism, i.e., run-time method binding or dynamic-binding. An object's dispatch table typically contains the addresses of the object's dynamically bound methods. Method calls are performed by fetching the method's address from the object's dispatch table. This is called resolving the method or function. The dispatch table is the same for all objects belonging to the same class, and is therefore typically shared between them. Thus, fetching the method's address from a given dispatch table offset will get the method corresponding to the object's actual class. Child dispatch table is lower in the inheritance hierarchy than a parent dispatch table.

Preferably, the optimization under the present invention takes place by processing object modules or files, which might contain the dispatch tables, generated based on compiled or linked code. The file processing according to the present invention may be done as a part of the compilation of the source code or linking of the object code. Alternatively, the present invention can be implemented as a separate code optimization tool.

In one exemplary embodiment, the present invention scans COFF or ELF formatted files (herein after referred to object files) during a pre-link process to eliminate unused virtual functions. In the exemplary SDR application, this process results in the removal of unused code associated with the ORB, the SCA core framework, and any waveforms. Note that the dead code removal tool generally available in most compilers for deleting unused functions is ineffectual in reducing virtual function related code size because those functions are referenced in dispatch table data, and the dead code removal tool is incapable of deleting unused virtual functions referenced dispatch tables.

As stated above, the present invention optimizes code size by eliminating dead code associated with run-time dispatching of object-oriented methods, such as unused virtual functions, thereby optimizing memory usage. Suppose Classes A, B, C, and D have the following inheritance structure:

A is the top class. A declares and defines virtual function foo( ).

B inherits from A. B declares and defines virtual function foo( ).

C inherits from B. C declares and defines virtual function foo( ).

D inherits from C. D declares and defines virtual function foo( ).

Therefore, suppose Class A defines a virtual function, foo( ), that is also defined in Classes B, C, and D.

The first code reduction optimization for this example occurs if the program does not ever call any of the foo( ) virtual functions. In this case all references to A::foo( ), B::foo( ), C::foo( ) and D::foo( ) are eliminated from the dispatch tables thus allowing a program-build-tool-chain to eliminate the unused foo( ) virtual functions.

The second code reduction optimization presently in the invention occurs if at least one of the foo( ) virtual functions is used:
C*x= . . . //could be a C object or a D object widened to a C*;
. . .
x→foo( . . . );

Thus, C::foo( ), D::foo( ) would be designated as "used" because, depending on program flow, C::foo( ) and/or D::foo( ) could be used. Because A::foo( ) and B::foo( ) are not and cannot be called in the program, A::foo and B::foo( ) would be designated as "unused." The present invention eliminates all dispatch table references to "unused" virtual functions, while keeping dispatch table references to used virtual functions. As a result, the dispatch table only contains references to "used" virtual functions. Under this arrangement, a program-build-tool-chain with prior art optimization (1) and possibly (2) above would then eliminate the unused A::foo( ) and B::foo( ) virtual functions. Thus, the present invention results in a significant reduction of code size.

Therefore, under the exemplary embodiment of the present invention discussed above, a determination is made as to whether a virtual function is called at all by a program. If not, all references to that virtual function are deleted from the dispatch tables. Otherwise, the invention finds the highest inheritance level associated with a virtual function call. All references to virtual functions above the found highest inheritance level are designated as "unused" and those below the highest inheritance level are designated as "used." The invention then deletes all references to the "unused" virtual functions.

As is well known, various declarations can be associated with function variables. An "external variable" is a variable that is declared outside of a function. When a variable is declared external (by directive ".extern") no memory is reserved for it, because the variable already exits external to the function. In normal circumstances, these external references are defined as "strong." In special circumstances, a variable may be declared "weak" (by directive ".weak") to prevent generation of compilation errors if the function associated with the variable is not found. Instead, the memory address reference associated with the "weak" variable is set to zero and no link-time error is generated for the unresolved symbol.

The present invention introduces an extension to the syntax and semantics of existing object file formats call a "soft reference" (directive ".soft"). The "soft reference" defines a symbol reference that the linker either sets to the address of the referenced symbol if some other "strong" or "weak" reference in program's linking closure exists or eliminate the reference. A soft reference is useful for indicating that a reference "might not be used."

In summary the three reference types can be viewed as follows by the program-build-tool-chain:

strong reference: the symbol referred to by the reference is required in the resulting program. Issue an error if it is missing.

weak reference: the symbol referred to by the reference is desired in the resulting program if it is available to the linker. Set the reference to zero if the reference cannot be resolved to a symbol. Linker should not issue an error if the symbol is missing.

soft reference: the symbol referred to by the reference is not desired in the resulting program unless some other weak or strong reference causes the symbol to be included. Eliminate the reference if the reference cannot be resolved to a symbol. Linker should not issue an error if the symbol is missing.

The third code reduction optimization for the above example occurs by determining in the program-build-tool-chain the classes with virtual functions for which objects are not constructed in program's code. In the above example, if no instances of the D class are actually created in a given program, then the D::foo( ) cannot ever be called and is thus "unused." This determination is possible through various methods including (i) semantic analysis of the original source code to find if instances of the D class are constructed or (ii) the examination of the program's object code to find if any calls are made to non-inlined D class constructors if no inline constructors exist for class D. Once the determination that an instance is never constructed for a class all references in that classes' dispatch table can be marked as "soft reference".

As is well known, non-virtual calls to virtual functions are declared "external" (by .extern directive) during compilation. Also declared "external" during compilation are virtual calls to virtual functions that reference both the dispatch table and the virtual function of the static type of the call. It should be noted that the generated call logic doesn't change, just the generation of the directives changes.

In the present invention, the following modifications to a typical C++ compiler implements the three code optimizations techniques described above:

Referring to FIG. 1, a flow chart of the method for reducing the object code size according to the present invention is shown. The size reduction relates to an application that requires run-time dispatching of object oriented methods. The method comprises scanning an object file corresponding to the application for references to object oriented methods in a dispatch table that performs run-time object oriented method binding, block 110. All references to object oriented methods that are not called by the application are also designated as unused, block 120. The highest inheritance level associated with an object oriented method is found, block 130. All references to object oriented methods above the highest inheritance level are designated as unused, block 140. All references to object oriented methods below the highest inheritance level are designate as used, block 150. All references to object oriented methods that are designated as unused are deleted from the dispatch table, block 160.

At compilation:

1. All dispatch table references to virtual functions are generated as soft references.

2. As is current practice, all non-virtual calls to virtual functions are generated as strong references.

3. All calls to constructors (either inline or non-inline) for classes with or inheriting virtual functions must also generate a strong reference to the dispatch table for the class being constructed.

At link:

1. As is the current practice, make a pass over all of the object code files and libraries resolving all strong and weak references (as now).

2. Scan all object files for any calls to virtual functions. For each of these virtual function calls modify the entry for the virtual function in dispatch table that corresponds to the static class type of the call so that the reference to the static class type virtual function is now a strong reference. Modify the corresponding virtual function entry to a strong reference in all of the dispatch tables for the classes that inherit from the static class type of the call.

3. Make another pass resolving soft references to symbols already included by step 1.

4. For each symbol resolved in step 2, resolve all of the corresponding entries in every child dispatch table.

5. Eliminate all of the dispatch tables that do not have a strong reference to them.

The result is that all of the virtual functions that could never be called by any of the code in the program are removed.

Thus, in one exemplary embodiment, a method for reducing the size of code derived from compilation of a source code that supports object oriented classes having defined inheritance structure. At least one higher level class within the inheritance level defines at least one run-time dispatching of an object-oriented method associated with a dispatch table that contains the addresses of the object's dynamically bound methods. Method calls are performed by fetching the method's address from the object's dispatch table. This is called resolving the method or function. The method determines whether the source code calls the at least the one run-time dispatching of the object-oriented method and eliminates at least one reference to the at least the one run-time dispatching of the object-oriented method in the associated dispatch table if the source code dose not call the at least the one run-time dispatching of the object-oriented method.

The invention claimed is:

1. A method for reducing object code size of an application that requires run-time dispatching of object oriented methods, comprising:
   scanning an object file corresponding to the application for references to object oriented methods in a dispatch table that performs run-time object oriented method binding;
   determining whether the object code or source code contains calls to the object-oriented methods that are capable of being dispatched to implementations of the object-oriented methods;
   finding, in a hierarchy of inheritance levels where a highest level of the hierarchy is configured to not inherit from other levels of the hierarchy and where the highest level of hierarchy is above a level that inherits from the highest level, the highest inheritance level associated with an object oriented method;
   designating as unused all references to object oriented methods above the highest inheritance level and all references that are not called by the application;
   designating as used all references to object oriented methods below the highest inheritance level;
   deleting from the dispatch table all references to object oriented methods that are designated as unused;
   eliminating a reference to the object-oriented method in the dispatch table when it is determined that the source code does not call the object-oriented method; and
   eliminating all of the object-oriented method implementations that are not capable of being dispatched based on the determining step by modifying the object code or a linking process.

2. The method of claim 1, wherein the object oriented method supports dynamic-binding in object-oriented programming.

3. The method of claim 1, wherein the object oriented method comprises a virtual function method.

4. The method of claim 1, wherein said method is implemented as a program-build-tool-chain.

5. The method of claim 1, wherein said method is implemented as a code optimization tool.

6. The method of claim 1, wherein said method is implemented during the compilation of a source code or linking of an object code.

7. The method of claim 1, wherein said object file is generated from at least one of a compiled or linked code.

\* \* \* \* \*